(12) United States Patent
Daraio

(10) Patent No.: US 9,080,088 B2
(45) Date of Patent: Jul. 14, 2015

(54) GRANULAR CRYSTAL

(71) Applicant: CALIFORNIA INSTITUTE OF TECHNOLOGY, Pasadena, CA (US)

(72) Inventor: Chiara Daraio, Pasadena, CA (US)

(73) Assignee: CALIFORNIA INSTITUTE OF TECHNOLOGY, Pasadena, CA (US)

( * ) Notice: Subject to any disclaimer, the term of this patent is extended or adjusted under 35 U.S.C. 154(b) by 0 days.

(21) Appl. No.: 13/766,724

(22) Filed: Feb. 13, 2013

(65) Prior Publication Data

US 2013/0187094 A1    Jul. 25, 2013

Related U.S. Application Data

(60) Division of application No. 13/434,821, filed on Mar. 29, 2012, now Pat. No. 8,397,549, which is a division of application No. 12/364,947, filed on Feb. 3, 2009, now Pat. No. 8,191,401, which is a continuation-in-part of application No. 12/251,164, filed on Oct. 14, 2008, now Pat. No. 8,327,709.

(60) Provisional application No. 61/063,903, filed on Feb. 7, 2008, provisional application No. 61/067,250, filed on Feb. 27, 2008, provisional application No. 61/124,920, filed on Apr. 21, 2008.

(51) Int. Cl.

| G01M 7/08 | (2006.01) |
| G01M 3/34 | (2006.01) |
| C09K 3/00 | (2006.01) |
| G10K 15/00 | (2006.01) |
| G10K 15/04 | (2006.01) |
| G01N 33/38 | (2006.01) |
| G01N 3/303 | (2006.01) |

(52) U.S. Cl.
CPC . *C09K 3/00* (2013.01); *G10K 15/00* (2013.01); *G10K 15/043* (2013.01)

(58) Field of Classification Search
CPC .......... C09K 3/00; G10K 15/043; G10K 15/00
USPC ............ 73/11.01, 11.02, 12.01, 12.04, 12.05, 73/12.11, 12.13, 12.14, 649
See application file for complete search history.

(56) References Cited

U.S. PATENT DOCUMENTS

| 2006/0207913 A1 | 9/2006 | Hong ........................... 206/584 |
| 2009/0204344 A1 | 8/2009 | Daraio et al. |

FOREIGN PATENT DOCUMENTS

| JP | 2002-168961 | 6/2002 |
| JP | 2005-300276 | 10/2005 |

(Continued)

OTHER PUBLICATIONS

Daraio, C. et al., "Tunability of solitary wave properties in one-dimensional strongly nonlinear phononic crystals", Phys. Rev. E; 73, 026610 (2006), pp. 1-10.*

(Continued)

*Primary Examiner* — Laura Martin
*Assistant Examiner* — Rose M Miller
(74) *Attorney, Agent, or Firm* — Steinfl & Bruno LLP

(57) ABSTRACT

Granular crystals with one or more chains of particles are described. A geometry of at least one particle is chosen to provide highly nonlinear pulses having selected characteristics. Contact interactions between the particles are non-Hertzian.

10 Claims, 4 Drawing Sheets

(56) References Cited

FOREIGN PATENT DOCUMENTS

| WO | 2005085902 | 9/2005 |
|---|---|---|
| WO | 2009100061 | 8/2009 |
| WO | 2009100064 | 8/2009 |

OTHER PUBLICATIONS

Herbold, E.B. et al., "Solitary and shock waves in discrete nonlinear double power-law materials", Applied Physics Letters, 90, 2161902 (2007) pp. 1-3.*
PCT International Preliminary Report on Patentability for PCT/US2009/032954 mailed on Sep. 11, 2009.
PCT International Report on Patentability mailed on May 15, 2012 for PCT/US2011/026371 filed on Feb. 25, 2011 in the name of California Institute of Technology.
First Office Action mailed on Nov. 24, 2011 for Chinese Patent Application No. 200880126412.2 filed on Oct. 14, 2008 in the name of California Institute of Technology.
Second Office Action mailed on May 29, 2012 for Chinese Patent Application No. 200880126412.2 filed on Oct. 14, 2008 in the name of California Institute of Technology.
Notification on Grant of Patent Right for Invention mailed on Aug. 30, 2012 for Chinese Patent Application No. 200880126412.2 filed on Oct. 14, 2008 in the name of California Institute of Technology.
Notification of Reasons for Refusal mailed on Apr. 23, 2013 for Japanese Patent Application No. 2010-545855 filed on Oct. 14, 2008 in the name of California Institute of Technology.
Final Office Action mailed on May 24, 2012 for U.S. Appl. No. 12/251,164, filed Oct. 14, 2008 in the name of Chiara Daraio.
Notice of Allowance mailed on Aug. 31, 2012 for U.S. Appl. No. 12/251,164, filed Oct. 14, 2008 in the name of Chiara Daraio.
Notice of Allowance mailed on Jun. 23, 2011 for U.S. Appl. No. 12/364,974, filed Feb. 3, 2009 in the name of Damien Eggenspieler.
Turnbull, D., et al., "Beam Steering with Pulsed Two-Dimensional Transducer Arrays." 1991, *IEEE Trans Ultra, Ferro, Freq.* 38(4): 320-333.
Holt, R. G., et al.,"Bubbles and HIFU: the good, the bad and the ugly", in Andrew, M. A, Crum, L. A, Vaezy. S, Proceedings of the 2nd International Symposium on Therapeutic Ultrasound, 2002, pp. 120-131.
Ambati, M., et al., "Surface resonant states and superlensing in acoustic metamaterials", Physical Review B, 75 (19) 195447-1 to 195447-5, 2007.
Bandaru, P. R. et al. "Novel electrical switching behavior and logic in carbon nanotube Y-junctions", Nature Materials, 4, 663-666, 2005. Abstract Only.
Buckingham, J.M., "Imaging the ocean with ambient noise", Nature, 1992, 356, 327-329.
Carretero-Gonzalez, R., et al., "Dissipative Solitary Waves in Periodic Granular Media", Physical Review Letters, 102,024102, 2009.
Chatterjee, A., "Asymptotic solution for solitary waves in a chain of elastic spheres", Physical Review E, 1999, 59 (5): 5912-2919.
Coste, C., et al., "Sound propagation in a constrained lattice of beads: High-frequency behavior and dispersion relation", Physical Review E, 2008, 77 (2), 021302-1 to 021302-13.
Daraio, C., et al., "Dynamic nanofragmentation of carbon nanotubes", Nano Letters, 2004, 4 (10): 1915-1918.
Daraio, C., et al., "Impact response by a foamlike forest of coiled carbon nanotubes", Journal of Applied Physics, 2006, 100 (6).
Daraio, C., et al., "Method and Device for Actuating and Sensing Highly Nonlinear Solitary Waves in Surfaces", Structures and materials, 2011, University of Pittsburg. 2 pages.
Daraio, C., et al., "Novel NDE/SHM approach based on highly nonlinear dynamics", 2008 National Science Foundation, CMMI—Dynamical Systems, p. CMMI-0825345. Abstract Only.
Datta, Subhendu K., Book Review of "Wave propagation in solids and fluids" (by Davis, J.L., published by Springer-Verlag, New York, NY, 1988). Aug. 3, 2006, SIAM Rev., 32 (3), 500-501.

Dhawan, A.P., et al, "Ch. 1: Intro to Medical Imaging and Image Analysis: A Multidisciplinary paradigm", *Principles and Advanced Methods in Medical Imaging and Image Analysis* by World Scientific Publishing Co. Pte. Ltd, 2008, pp. 1-8.
Dickson, J.A., et al., "In vivo hyperthermia of yoshida tumour induces entry of non-proliferating cells into cycle", Nature, 1976, 263: 772-772.
Fatemi, M., et al., "Ultrasound-stimulated vibro-acoustic spectrography", Science, 1998, 280 (5360); 82-84.
Fink, M., "Time-reversal of ultrasonic fields", IEEE Transactions on Ultrasonics Ferroelectrics and Frequencey Control, 1992, 39 (5): 555-566.
Fok, L, et al., "Acoustic Metamaterials", MRS Bulletin, 33 (10): 931-934, 2008.
Fraternali, F., et al., "Optimal design of composite granular protectors", Mechanics of Advanced Materials and Structures, 2010, 17:1-19.
Hakansson, A., et al, "Acoustic lens design by genetic algorithms", Physical Review B, 70 (21), 214302-204311, 2004.
Hakansson, A., et al., "Sound focusing by flat acoustic lenses without negative refraction", Appl. Phys. Lett., 2005, 86; 054102-1 to 054102-3.
Hecht, E., et al., "Optics", $4^{th}$ Edition, Pearson Addison-Wesley, Menlow Park, CA, Spring 2008, 2 pages total.
Hong, J., et al., "Characterization of soliton damping in the granular chain under gravity", Physical Review E., 2000, 61 (1): 964-967.
Hong, J., et al., "Solitary Waves in the Granular Chain", Physics Report, 2007, pp. 1-46.
Job, S., et al., "Solitary wave trains in granular chains: experiments, theory and simulations", Granular Matter, 2007, 10: 13-20.
Johnson, K.L., "Contact Mechanics", Cambridge University Press, UK, 2004, pp. 84-94.
Johnson, P.A., et al., Physical Acoustics: Nonlinear Acoustics of Unconsolidated Granular Media I, J. Acoust. Soc. Am., 2008, 123: 3271-3272.
Krim, H., et al., "Two Decades of Array Signal Processing Research", IEEE Signal Processing Magazine, 1996, 67-94.
Kushibiki, J., et al., "Material characterization by line-focus-beam acoustic microscope", IEEE Transactions on Sonics and Ultrasonics, SU-32 (2); 189-212, 1985.
Li, J., et al., "Experimental demonstration of an acoustic magnifying hyperlens", Nature Materials, 2009, 8:931-934.
Manciu, M., et al., "Dynamics of gravitationally loaded chain of elastic beads", Chaos, 2000, 10 (3): 658-669.
Nesterenko, V.F., et al., "Architectural Acoustics: Acoustics of Concert Halls II", J. Acoust. Soc. Am., 2008, 123 (5), Pt. 2: 265 pages.
Nesterenko, V.F., "Nonlinear Impulses in Particulate Materials", *Dynamics of Heterogenous Materials*, Springer New York, 2001, pp. 1-136.
Nesterenko, V.F., et al., "Strongly nonlinear behavior of granular chains and granular composites", J Acoust Soc Am, 2008, 123 (5): 3271. Abstract Only.
Ponomarenko, S.A., et al., "Linear optical bullets", Opt. Commun., 2006, 26 (1): 1-4.
Rosas, A., et al, "Pulse dynamics in a chain of granules with friction", Phys Rev E Stat Nonlin Soft Matter Phys., 2003, 68 (4 Pt 1): 041304. Abstract Only.
Rosas, A., et al., "Pulse propagation in chains with nonlinear interactions", Physical Review E, 2004, 69: 016615-1 to 016615-4.
Sadd, M.H., et al., "Contact law effects on wave propagation in particulate materials using distinct element modeling", International Journal of nonlinear mechanics, 1993, 28 (2); 251-265.
Sen, S., et al, "Impulse backscattering based detection and imaging of shallow buried objects", Granular Material-Based Technologies Symposium, (Mater. Res. Soc. Symposium Proceedings vol. 759), 2003, 65-72.
Shellman, Y.G., et al., "Hyperthermia induces endoplasmic reticulum-mediated apoptosis in melanoma and non-melanoma skin cancer cells", J. Invest. Dermatol., 2007, 128 (4): 949-956.
Shukla, A., et al., "Influence of loading pulse duration on dynamic load transfer in a simulated granular medium", J. Mech. Phys. Solids, 1993, 41 (11): 1795-1808.

(56) References Cited

OTHER PUBLICATIONS

Silberberg, Y., "Collapse of optical pulses", Optics Letters, 1990, 15 (22): 1282-1284.

Sukhovich, A., et al, "Negative refraction and focusing of ultrasound in two-dimensional phononic crystals", Physical Review B, 77 (1), 014301-1 to 014301-9, 2008.

Yang, S.X., et al., "Focusing of sound in a 3D phononic crystal", Physical Review Letters, 93 (2), 2004, 024301-1 to 024301-4.

Zhang, X., et al., "Superlenses to overcome the diffraction limit", Nat. Mater., 2008, 7: 435-441.

Zhu, Y., et al., "Propagation of explosive pulses in assemblies of disks and spheres", J Eng Mech-ASCE, 1997, 123 (10): 1050-1059.

Hong, J. et a., "Nondestructive Identification of Impurities in Granular Medium" Applied Physics Letters, vol. 81, No. 25; Dec. 16, 2002, pp. 4868-4870.

Communication pursuant to Rules 70(a) and 70a(2) EPC mailed on Apr. 1, 2014 for European Application No. 08872034.7 filed Jul. 28, 2010 in the name of California Institute of Technology.

Supplementary European Search Report completed on Mar. 7, 2014 for European Application No. 08872034.7 filed Jul. 28, 2010 in the name of California Institute of Technology.

Non-Final Office Action mailed on Dec. 20, 2012 for U.S. Appl. No. 13/035,681, filed Feb. 25, 2011 in the name of California Institute of Technology.

Final Office Action mailed on Jul. 23, 2013 for U.S. Appl. No. 13/035,681, filed Feb. 25, 2011 in the name of California Institute of Technology.

Advisory Action mailed on Dec. 4, 2013 for U.S. Appl. No. 13/035,681, filed Feb. 25, 2011 in the name of California Institute of Technology.

Notice of Allowance mailed on Jan. 9, 2014 for U.S. Appl. No. 13/035,681, filed Feb. 25, 2011 in the name of California Institute of Technology.

Porter, M.A. et al., "Highly Nonlinear Solitary Waves in Phononic Crystal Dimers" May 23, 2007, pp. 1-4.

Maris, H. et al., "Negative Pressures and Cavitation in Liquid Helium" *Physics Today*, Feb. 2000, pp. 29-34.

Fink, M. "Time-Reversed Acoustics" *Scientific American*, Nov. 1999, pp. 91-97.

\* cited by examiner

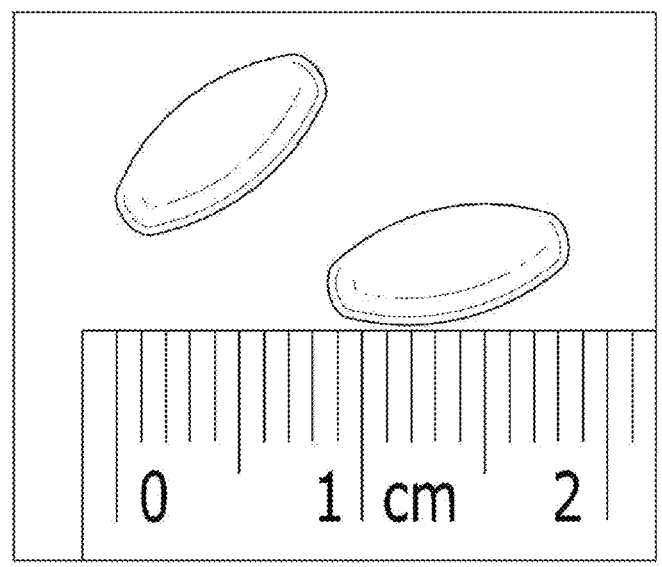
FIG. 1
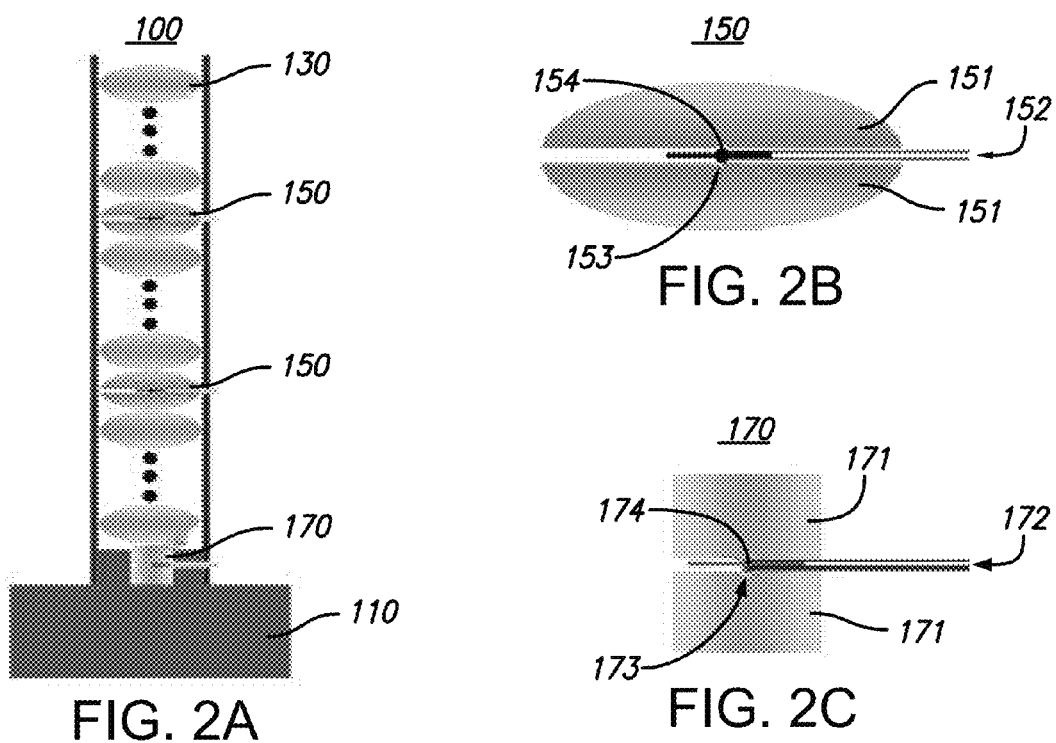
FIG. 2A
FIG. 2B
FIG. 2C

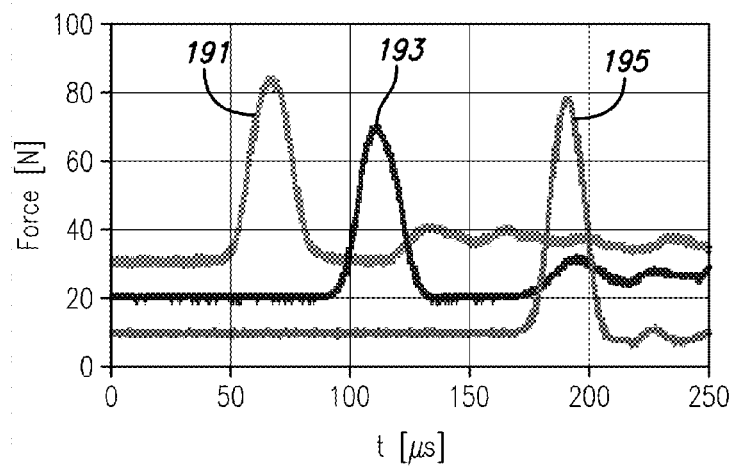
FIG. 3
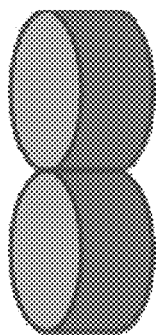 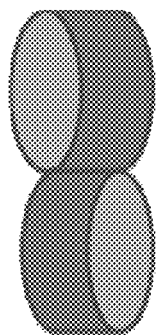
FIG. 4A  FIG. 4B
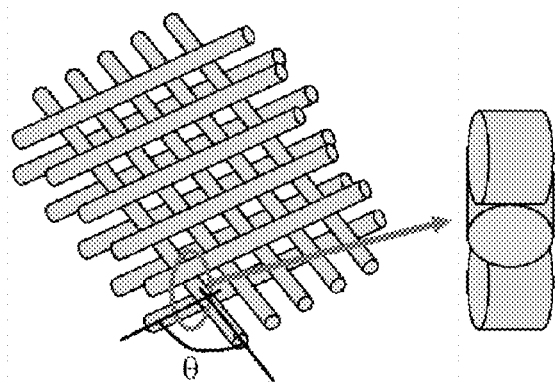
FIG. 4D
FIG. 4C

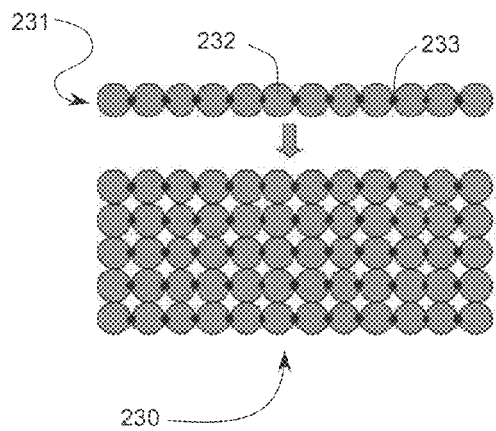 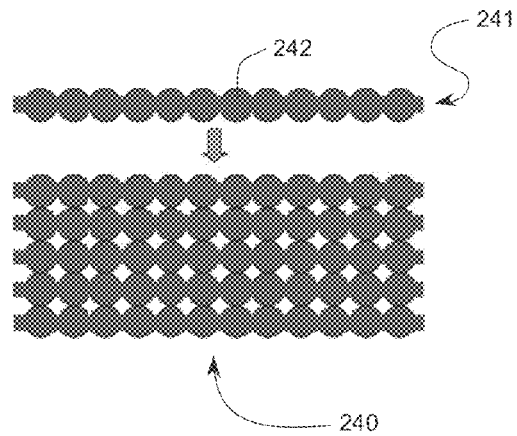
FIG. 7A  FIG. 7B
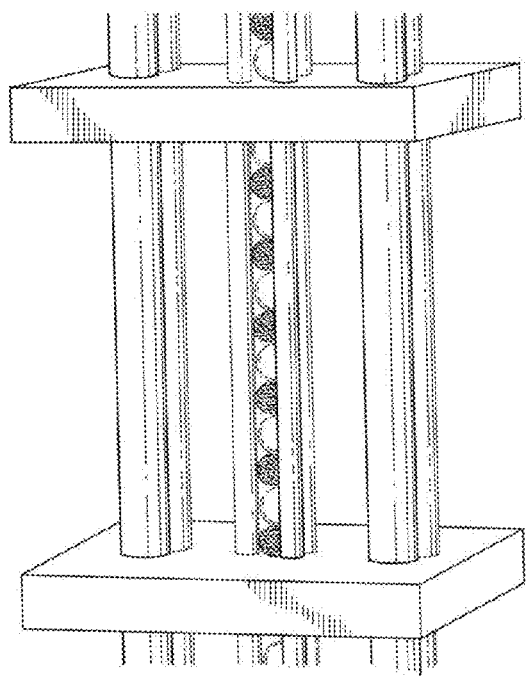
FIG. 8

US 9,080,088 B2

GRANULAR CRYSTAL

CROSS-REFERENCE TO RELATED APPLICATIONS

The present application is a U.S. divisional application of U.S. patent application Ser. No. 13/434,821, filed on Mar. 29, 2012, which, in turn, is a U.S. divisional application of U.S. patent application Ser. No. 12/364,947, filed on Feb. 3, 2009, now U.S. Pat. No. 8,191,401 which, in turn, is a continuation-in-part of U.S. patent application Ser. No. 12/251,164, "Method and Apparatus for Nondestructive Evaluation and Monitoring of Materials and Structures," filed on Oct. 14, 2008, now U.S. Pat. No. 8,327,709 and is related to and claims the benefit of U.S. Provisional Application No. 61/063,903, titled "Method and device for actuating and sensing highly nonlinear solitary waves in surfaces, structures and materials," filed on Feb. 7, 2008, U.S. Provisional Application No. 61/067,250, titled "System Supporting the Formation and Propagation of Tunable Highly Nonlinear Pulses, Based on Granular Chains Composed of Particles with Non Spherical Geometry," filed on Feb. 27, 2008, and U.S. Provisional Application No. 61/124,920, titled "Method and Apparatus for Nondestructive Evaluations and Structural Health Monitoring of Materials and Structures," filed on Apr. 21, 2008 the contents of all of which are incorporated herein by reference in their entirety.

STATEMENT REGARDING FEDERALLY SPONSORED RESEARCH OR DEVELOPMENT

This invention was made with government support under Grant No. CMMI0825345 awarded by the National Science Foundation. The government has certain rights in the invention.

BACKGROUND

1. Field

This disclosure relates to a method and system for the formation and propagation of highly nonlinear pulses with selectable pulse properties. More particularly, the present disclosure describes the generation and propagation of pulses through the use of granular chains consisting of particles with desirable geometries.

2. Description of Related Art

The existence of the highly nonlinear regime of wave propagation in solids was discovered while studying the shock absorption properties of granular matter. The model typically used to represent the simplest form of granular systems consisted of a one dimensional (1-D) chain of spherical beads regulated by Hertzian contact interaction potentials. However, a new, general wave dynamic theory, supporting compact solitary waves, was derived for all structured homogeneous materials showing a highly nonlinear force (F)–displacement ($\delta$) response dictated by the intrinsically nonlinear potential of interaction between its fundamental components. This general nonlinear spring-type contact relation can be expressed as shown below in Eq. (1):

$$F \cong A\delta^n \quad \text{Eq. (1)}$$

where A is a material's parameter and n is the nonlinear exponent of the fundamental components' contact interaction (with n>1). For Hertzian systems, such as those consisting of a chain of spherical beads, the n exponent of interaction is equal to 1.5.

Within the present disclosure, "granular matter" is defined as an aggregate of "particles" in elastic contact with each other, preferably in linear or network shaped arrangements. In addition to the nonlinear contact interaction present in such systems, and related purely to the particle's geometry, another unusual feature of the granular state is provided by the zero tensile strength, which introduces an additional nonlinearity (asymmetric potential) to the overall response. In the absence of static precompression acting on the systems, these properties result in a negligible linear range of the interaction forces between neighboring particles leading to a material with a characteristic sound speed equal to zero in its uncompressed state ($c_0=0$): this has led to the introduction of the concept of "sonic vacuum". This makes the linear and weakly nonlinear continuum approaches based on Korteveg-de Vries (KdV) equation invalid and places granular materials in a special class according to their wave dynamics. This highly nonlinear wave theory supports, in particular, a new type of compact highly tunable solitary waves that have been experimentally and numerically observed in several works for the case of 1-D Hertzian granular systems.

SUMMARY

Embodiments of the present invention described herein include a method and system supporting the formation and propagation of tunable highly nonlinear pulses using granular chains composed of non-spherical granular systems and a linearized version thereof supporting the formation of tunable acoustic band gaps. Other embodiments of the present invention include a method and system to support the creation of tunable acoustic band gaps in granular crystals formed of particles with different geometries (spherical or not) in which the tunability is achieved by varying the static precompression, type of excitation and/or pulse amplitude in the system.

BRIEF DESCRIPTION OF THE SEVERAL VIEWS OF THE DRAWINGS

FIG. 1 shows a photograph of stainless steel elliptical particles.

FIG. 2A shows an experimental set up of a vertically stacked chain of stainless steel elliptical beads.

FIG. 2B shows a sensor particle having an encapsulated piezo-sensor.

FIG. 2C shows a wall sensor having an encapsulated piezo-sensor.

FIG. 3 shows the formation of solitary waves excited by impact in a chain of stainless steel elliptical beads.

FIGS. 4A and 4B illustrate relative orientations of a pair of cylindrical particles.

FIG. 4C shows a schematic diagram of a 3-D system assembled from an array of cylindrical contacts.

FIG. 4D illustrates the vertical alignment of the cylindrical contacts in FIG. 4C.

FIG. 7A shows a system in which one dimensional chains of particles are held to each other at weld points.

FIG. 7B shows a system in which each layer is a molded layer having individual particles of various geometric shapes.

FIG. 8 shows a photograph of an experimental assembly used for a study of a dimer chain consisting of alternating stainless steel and Teflon particles.

DETAILED DESCRIPTION

Figure 5:
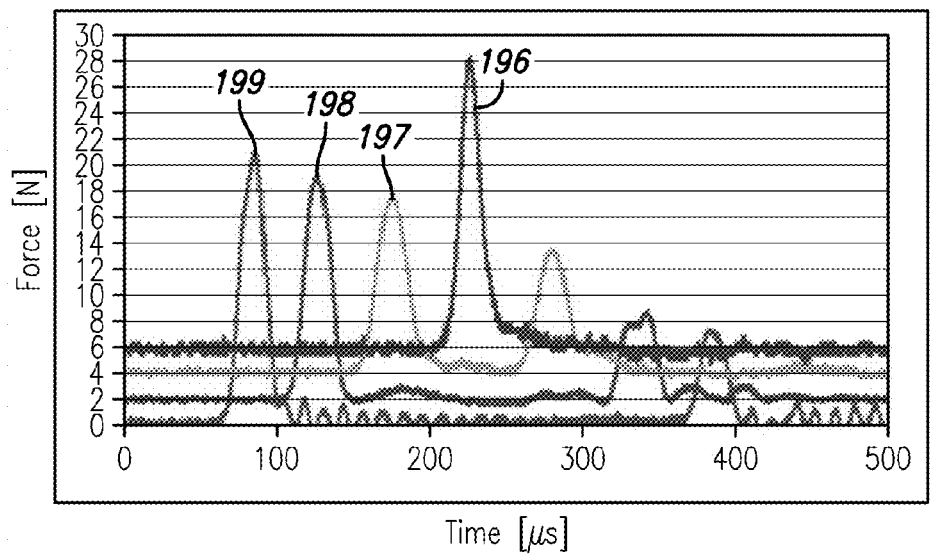
FIG. 5 shows experimental data obtained from a vertically aligned chain of cylinders oriented perpendicular to each other.

Granular materials based on geometrical arrangements of spherical beads are the simplest and most common systems used theoretically, numerically, and experimentally for studying the formation and propagation of the highly nonlinear waves in solids. Despite being the most studied example for these systems, they are not the only one possible solution for the creation of systems with a highly nonlinear response. The continuum theory derived for highly nonlinear waves indeed is not limited to the Hertzian interactions ($n=3/2$) between the discrete components: the theoretical formulation that describes them has been extended and generalized to all nonlinear exponents n, with $n \neq 1$. Indeed, a similar power-law type response can be found in many other nonlinear systems. The analytical formulation of the highly nonlinear waves has also been extended to heterogeneous systems composed of "layered" structures. Additional work may be done analytically in parallel with experimental and numerical analysis for periodic heterogeneous nonlinear systems. The presence of periodic "defects" (heterogeneities) is particularly relevant for the design and study of shock protecting structures and energy dissipaters, as the defects play a relevant role in the scattering, redirecting sideways, or localization of energy and in the tunability of the compressive pulses traveling through the material. Such properties, in particular the ones found in heterogeneous granular systems, may provide valid alternatives to the present state of the art shock energy protectors/dissipaters The fundamental nonlinear dynamic response present in uniform systems is governed by the wave equation derived and solved in the continuum limit. For highly nonlinear uniform systems, the long wave approximation, derived from the Hertzian interaction law ($n=3/2$), is shown below in Eq. (2):

$$u_{tt} = -c^2 \left\{ (-u_x)^{3/2} + \frac{a^2}{10} [(-u_x)^{1/4} ((-u_x)^{5/4})_{xx}] \right\}_x \quad \text{Eq. (2)}$$

where u is the displacement, a is the particle's diameter, c is a material's constant, and the subscripts indicate the derivative. The constant c in Eq. (2) is given by Eq. (3) as shown below:

$$c^2 = \frac{2E}{\pi \rho_0 (1 - v^2)} \quad \text{Eq. (3)}$$

where E is the Young's modulus, $\rho_0$ is the density, and v is the Poisson coefficient. The generality of this highly nonlinear wave equation is given by the fact that it includes also the linear and weakly nonlinear wave equations.

Despite its apparent complexity the closed form solution of Eq. (2) can be obtained. For the case of a granular system with no or very weak precompression acting on it, the exact solution exists in the form as shown below in Eq. (4):

$$\xi = \left( \frac{5 V_p^2}{4 c^2} \right)^2 \cos^4 \left( \frac{\sqrt{10}}{5a} x \right) \quad \text{Eq. (4)}$$

where $\xi$ represents the strain and $V_p$ the system's velocity. The solitary shape, if the initial prestrain $\xi_0$ is approaching 0, can be taken as one hump of the periodic solution (provided from Eq. (4)) with finite wave length equal to only five particle diameters.

The periodic solution described above demonstrates that in a highly nonlinear medium (such as in "granular crystals") only two harmonics contribute to a stationary mode of propagation of the periodic signal. In analogy with the KdV solitons (as described by Korteveg and de Vries in "On the change of form of long waves advancing in a rectangular canal, and on a new type of long stationary Waves," London, Edinburgh and Dublin Philosophical Magazine and Journal of Science, ser. 5, 39, pp. 422-443. (1895)), the highly nonlinear solitary waves are supersonic, which means that their phase velocity is larger than the initial sound velocity ($c_0$) in the nonlinear medium (especially in the case of an uncompressed system, in which the $c_0=0$). One of their unique feature is the independence of their width on the amplitude (their spatial size is always ~5 particles diameter, no matter what wave amplitude or wave speed is present in the system) which makes them one of the most tractable forms of "compactons" (described by Rosenau and Hyman in "Compactons: Solitons with finite wavelength," Physical Review Letters 70, 564 (1993)). This property is quite different from the properties of weakly nonlinear KdV solitary waves and it is very important for the use of these solitary waves as information carriers and in signal transformation devices.

The speed of the solitary wave $V_s$, as a nonlinear function of the maximum particle dynamic strain in purely highly nonlinear systems, can be expressed as shown below in Eq. (5):

$$V_s = \frac{2}{\sqrt{5}} c \xi_m^{1/4} = 0.6802 \left( \frac{2E}{a \rho^{3/2} (1 - v^2)} \right)^{1/3} F_m^{1/6} \quad \text{Eq. (5)}$$

where $F_m$ is the maximum dynamic contacts force between the particles in the discrete chain. This relationship uncovers a useful characteristic of such waves, predicted by the theory and validated numerically and experimentally: their tunability. By changing the mechanical and/or the geometrical properties of the high nonlinear medium supporting the formation of highly nonlinear solitary waves, the shape and the properties of the traveling pulse can be tuned. As such, the solitary waves in the highly nonlinear media can be engineered for specific applications The analytical expression for the tunability of the solitary waves speed derived from the discretization of the particles in a precompressed chain may be expressed as shown in Eq. (6) below:

$$V_s = 0.9314 \left( \frac{4 E^2 F_0}{a^2 \rho^3 (1 - v^2)^2} \right)^{1/6} \frac{1}{(f_r^{2/3} - 1)} \left\{ \frac{4}{15} [3 + 2 f_r^{5/3} - 5 f_r^{2/3}] \right\}^{1/2}. \quad \text{Eq. (6)}$$

where $F_0$ represents the static precompression added to the system, $f_r = F_m/F_0$ and $F_m$ is the maximum contacts force between the particles in the discrete chain. The dependence of the solitary wave properties on the materials parameters is shown in Eq. (5) for a non-prestressed system and in Eq. (6) for a prestressed system. Another feature of the highly nonlinear solitary waves is determined by the fact that the system is size independent and the solitary waves can therefore be scalable to any dimension, according to the needs of each specific application. According to Eqs. (5) and (6), the tunability of the highly nonlinear solitary waves can be achieved varying one or more of the characteristic parameters of the nonlinear media.

The generalized form of the partial differential equation describing the highly nonlinear regime in binary heterogeneous periodic systems has been and can be expressed as shown in Eq. (7) below:

$$u_{\tau\tau} = u_x^{n-1} u_{xx} + G u_n^{n-3} u_{xx}^3 + H u_x^{n-2} u_{xx} u_{xxx} + I u_x^{n-1} u_{xxxx} \qquad \text{Eq. (7)}$$

where u is the displacement, $\tau$ is a rescaled time, n is the nonlinear exponent found in Eq. (1) and the explicit expression of the parameters I, H, G can be found in Porter, M. A.; Daraio, C.; Herbold, E. B.; Szelengowicz, I.; Kevrekidis, P. G. "Highly nonlinear solitary waves in phononic crystal dimers" Physical Review E, 77, 015601(R), 2008. As shown in Porter et al., the expressions for G, H, and I are as follows:

$$G = D^2 \frac{(2 - 3k + k^2) m_1^2}{6(m_1 + m_2)^2},$$

$$H = D^2 \frac{2(k - 1)(2m_1^2 + m_1 m_2 - m_2^2)}{6(m_1 + m_2)^2},$$

$$I = D^2 \frac{2(m_1^2 - m_1 m_2 + m_2^2)}{6(m_1 + m_2)^2}.$$

The solution for Eq. (7), describing the shape and properties of the highly nonlinear solitary waves, from direct integration is of the form shown in Eq. (8) below:

$$u_\xi = v = B \cos^{\frac{2}{n-1}} (\beta \xi), \qquad \text{Eq. (8)}$$

where $B = \left(\frac{\mu}{[\beta^2 s(s-1)]}\right)^{1/n-1}$, $\beta = \sqrt{\sigma} \frac{(1-\eta)}{2}$ and $s = pl$.

Highly nonlinear granular systems composed of spherical beads have been extensively studied in the past. Embodiments of the present invention comprise systems that may deviate from the classical Hertzian approach associated with systems using chains of spherical beads. Systems that do not rely upon chains of spherical beads include: chains composed of O-rings described by Herbold and Nesterenko in "Solitary and shock waves in discrete strongly nonlinear double power-law materials," Applied Physics Letters, 90, 261902, (2007), and complex 2-D and 3-D granular assemblies as described by Goddard in "Nonlinear Elasticity and Pressure-Dependent Wave Speeds in Granular Media," Proc. R. Soc. Lond. A 430, 105 (1990). Coste and Falcon describe the possibility of obtaining deviations from the Hertzian type response also in 1-D chains of spherical beads composed of "soft" materials (i.e. bronze or polymer) in "On the validity of Hertz contact law for granular material acoustics," European Physical Journal B, 7, 155. (1999).

An embodiment of the present invention is a system that uses aligned stainless steel elliptical grains, such as those shown in FIG. 1. FIG. 1 shows a photograph of elliptical particles fabricated from stainless steel. Results demonstrate that 1-D chains composed of elliptical particles support the formation and propagation of highly nonlinear solitary waves when subjected to impulsive loading, following a non-Hertzian contact interaction law. FIG. 2A shows an experimental set up of a vertically stacked chain 100 of 20 stainless steel elliptical beads 130. Piezoelectric sensors are embedded in two sensor particles 150 at particles 7 and 12, as well as at a wall sensor 170 in contact with a wall 110. FIG. 2B shows the sensor particle 150 having a piezo-sensor 154 encapsulated in a glue layer 153 and sandwiched between two particle caps 151. Particle sensor leads 152 provide an electrical output from the sensor particle 150. Similarly, the wall sensor 170 shown in FIG. 2C has a piezo-sensor 174 encapsulated in a glue layer 173 sand sandwiched between two wall sensor caps 171. Wall sensor leads 172 provide an electrical output from the wall sensor 170.

FIG. 3 shows the formation of solitary waves excited by impact in the chain of twenty stainless steel elliptical beads. The twenty stainless steel elliptical beads (supplied by Kramer Industries) had m=0.925 g±0.001 g; minor axis equal to 4.76 mm; major axis equal to 10.16 mm; modulus of elasticity equal to 193 GPa; and v equal to 0.3. The beads were stacked in a vertical aluminum guide. Piezoelectric sensors were provided as shown in FIGS. 2A-2C by gluing custom micro-miniature wiring (supplied by Piezo Systems, Inc.) between the two caps of an elliptical bead cut length-wise. The sensors were calibrated to produce force versus time data by assuming conservation of linear momentum following the impact of a free falling bead. Impact was generated with 3.787 g striker traveling at 0.75 m/s striking the top particle in the chain; the average wave speed was calculated at 525 m/s. In FIG. 3, line 191 represents the data measured at the top sensor particle 150, Line 193 represents the data measured at the lower sensor particle 150, and line 195 represents the data measured at the wall sensor 170. It is noted that although highly nonlinear wave theory was derived for uniform systems with a general exponent governing their contact interaction law, experimental validation is typically provided only through Hertzian interactions and/or using spherical particles.

According to some embodiments of the present invention, the empirical determination of the "n" exponent in Eq. (1) for elliptical grains may be determined by either of the following two methods: a first method based on the single particle impact and conservation of momentum; or a second method based on the Force ($F_m$)-velocity ($V_s$) scaling similar to that described, for example, in "On the validity of Hertz contact law for granular material acoustics," European Physical Journal B, 7, 155. (1999) or in Porter et al., "Highly nonlinear solitary waves in phononic crystal dimers" Physical Review E, 77, 015601(R), 2008, for dimer chains. The second method, tested on spherical beads to verify its robustness has been shown to be reliable. The power law fit provided a value of the contact interaction exponent for irregular elliptical beads n~1.449, proving a deviation from classical Hertzian response.

A determination of the "n" exponent from Eq. (1) for elliptical particles was made by analyzing the data summarized in FIG. 3 using the second method described above. The average velocity of the solitary wave was determined by dividing the distance between the centers of the two particle sensors (equal to 5 particle diameters) by the time interval between the maximum force seen at these sensors. The average maximum force of the highly nonlinear pulses was determined by averaging the force amplitudes at the two sensor particles. The average velocity and average force amplitude for the solitons generated through various impulsive forces provided for force versus velocity data. Evaluation of the power-law relationship in light of the equations above provides that, for the measured elliptical particles, n~1.449.

An estimate of the "n" exponent from Eq. (1) for elliptical particles using the first method described above was also made by impacting a fixed sensor with an elliptical particle. To ensure that the particle retained proper orientation throughout free fall and contact with the sensor, a plastic guide rod was cemented to the upper portion of the particle. Assuming conservation of linear momentum and integrating numerically the Force versus time plots using Euler's method (beginning at the point of first contact between the elliptical particle and the sensor ($t_0$) until the particle reached a full stop in its descent (v(t)=0)), velocity versus time was obtained. Using the same procedure, the resulting velocity versus time curve was integrated again to produce displacement versus time. By matching experimentally obtained force data with calculated displacement data, a force versus displacement curve was produced. Best fit analysis of each resulting force versus displacement curve enabled determination of the exponent "n."

Embodiments of the present invention are not limited to systems and methods using elliptical beads. The results described earlier for 1-D chains of elliptical beads show the formation and propagation of highly nonlinear pulses in non-Hertzian systems and support the examination and use of 1-D granular chains composed of particles with different geometries. The selection of these grains having more complex non-spherical shapes may generally require the empirical determination of the contact interaction laws governing the Force ($F_m$)–displacement ($\delta$) response between the fundamental components of the systems; in particular for the cases where the analytical derivation of the contact mechanics has not been provided.

Other embodiments according to the present invention include systems and methods using particles having cylindrical geometry. One-dimensional arrays of cylinders (as opposed to the elliptical particles described earlier) may offer a potential for the practical assembly of 3-D systems and enable a large range of tunability of the level of nonlinearity (value of the exponent "n" in Eq. (1)). Such tunability can be achieved by the simple variation of the reciprocal axial orientation between the cylinders in the chain as described in additional detail below.

FIGS. 4A and 4B illustrate relative orientations of a pair of cylindrical particles. In FIG. 4A, the axis of the particles are oriented parallel to each other with $\theta=0°$. In FIG. 4B, the axis of the particles are oriented perpendicular to each other with $\theta=90°$. FIG. 4C shows a schematic diagram of a 3-D system assembled from an array of cylindrical contacts having vertical orientations of $0°<\theta<90°$. FIG. 4D illustrates the vertical alignment of the cylindrical contacts in FIG. 4C.

A 1-D array of cylinders with axis oriented parallel with respect to each other (as in FIG. 4A) do not support the formation of clean solitary waves because of their linear contact interaction dynamics. This represents a limit case in Hertz's approach to the study of interaction laws between solids of revolution and presents no simple analytical form for its description. An axial misalignment of $0°<\theta<90°$ where $\theta$ represents the angle between the axis of two consecutive cylinders in the chain (such as that shown in FIGS. 4C and 4D), brings back the system to a "manageable" geometry, falling back within the Hertzian treatment (n=1.5). The other limiting case ($\theta=90°$, such as in FIG. 4B) falls back into a second limit example and does not have a simple analytical solution for the contact law.

Experimental results from a 1-D stack of cylinders oriented at 0° and 90° with respect to each other has shown that by simply changing the angle of orientation between the axis of the cylinders it is possible to change drammatically the wave propagation response of the system. Cylinders oriented at 0° (parallel axis) excited by an impulse do not show the formation of highly nonlinear solitary waves (but rather presented the propagation of shock-like pulses). Chains with cylinders oriented in a 90° degrees configurations support formation and propagation of highly nonlinear solitary pulses analogous to the one observed in chains of spherical beads. FIG. 5 shows experimental data obtained from a vertically aligned chain of cylinders oriented perpendicular to each other. The chain consisted of a total of 38 cylinders. Piezogauges were inserted at a wall and in 3 of the cylinders within the chain. The data obtained from the wall sensor is shown at line 196; the data from the cylinders within the chain are shown at lines 197, 198, and 199.

Figure 6:
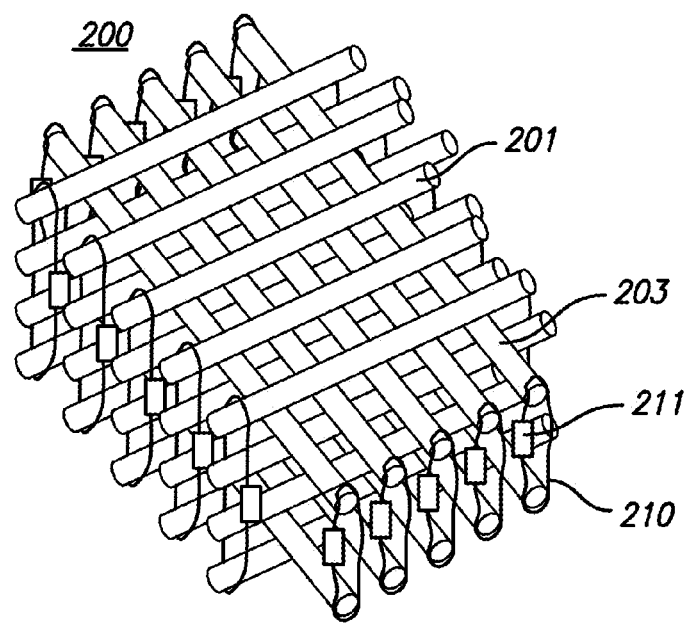
FIG. 6 shows a schematic diagram of a rod-based 3-D system 200 using precompression.

Rod-based structures similar to the one depicted in FIG. 4C can be tuned by applying variable static precompression. The application of such static force can be achieved, for example, by using tension cords, strings or nets wrapped on two opposing sides of the outer cylinders or rods edges. The control over the amount of compression applied by such elements to the assembled rods can be obtained by using small dynamometers or by tightening screws with measured torques. FIG. 6 shows a schematic diagram of a rod-based 3-D system 200 using precompression. The system has arrays of lateral rods 201 alternating with arrays of perpendicular rods 203. The outside ends of the lateral rods 201 are compressed together with tension cords 210 or other such fastening apparatus. Similarly, the outside ends of the perpendicular rods 203 are compressed together with tension cords 210 or other such fastening apparatus. A dynamometer 211 within each tension cord 210 may be used to measure and adjust the amount of precompression.

To obtain the dynamic response "purely" from the granular system without the influence of the matrix between the chains, it is possible to create desired three-dimensional systems in a cubic or hexagonal pattern at different length scales assembling the particles (elliptical, conical, rods, etc) in a layer-by-layer process. The new composite granular structures can be manufactured in large quantity in industrially viable processes. Depending upon the fabrication process used, it may be possible to create light weight, tunable and even flexible or wearable protective layers, all exploiting the new properties offered by the highly nonlinear wave theory discussed above. Such protective systems may allow for sideway impulse redirection, energy trapping and/or energy dissipation. FIG. 7A shows a system 230 in which one dimensional chains 231 of particles 232 (that may have various geometrical shapes) are held to each other at weld points 233 are assembled into layers for a 3-D array of particles. Note that in FIG. 7A, the particles 232 may be welded, glued or electrostatically/magnetically interacting together in the horizontal direction, but are merely contacting one another in the vertical direction. FIG. 7B shows a system 240 in which each layer 241 is a molded layer having individual particles 242 of various geometric shapes. Note that in FIG. 7B (similar to 7A), the layers 241 comprise molded particles in the horizontal direction, but are the layers are 241 are merely contacting one another in the vertical direction. As discussed above, the systems shown in FIGS. 7A and 7B may also have precompression applied.

The methods and systems described above have application for acoustic band gaps in tunable highly nonlinear crystals. Linear or weakly nonlinear periodic crystals with two or more atoms per primitive basis (precompressed dimer or trimer chains as described in Porter et al., "Highly nonlinear solitary waves in phononic crystal dimers," Physical Review E, 77, 015601(R), 2008. and Porter et al., "Propagation of Highly Nonlinear Solitary Waves in Phononic Crystal Dimers and Trimers," Physica D, submitted 2007) are known to have a classical phonon dispersion relation in which for each polarization mode in a given propagation direction, the dispersion relation develops two branches, known as the acoustical and optical branches. Depending on such relation, the system can present one or more frequency band gaps between the branches as a function of the mass ratio in the system and the precompression level applied to it. For a simple cubic crystal where atoms (analogous to Hertzian grains in the systems described above) of mass $m_1$ lie on one set of planes and atoms of mass $m_2$ lie on planes interleaved between them, the lower bound ($f_1$) and upper bound ($f_2$) of the bandgap can be expressed by Eq. 9 shown below:

$$f_1 = \frac{1}{2\pi}\left(\frac{2\beta}{m_1}\right)^{1/2}, f_2 = \frac{1}{2\pi}\left(\frac{2\beta}{m_2}\right)^{1/2}. \quad \text{Eq. (9)}$$

In Eq. 9, β is a constant proportional to the material's parameters (Youngs modulus, Poisson's coefficient and particle's radii) and static precompression applied to the system (see. For example, Herbold, E. B.; Kim, J.; Nesterenko, V. F.; Wang, S.; Daraio, C. "Tunable frequency band-gap and pulse propagation in a strongly nonlinear diatomic chain" Acta Mechanica (submitted and published online), 2008).

Preliminary results were obtained from the study of dimer systems of stainless steel and Teflon particles excited by continuous sinusoidal signals at variable frequencies. FIG. 8 shows a photogrpah of the experimental assembly used for the study in which the dimer chain consisted of alternating stainless steel and Teflon particles. The band gap calculated for this model system was between ~7-14 kHz. The excitations with frequencies comprised in the estimated gap (as provided in Eq. (9)) remained confined in the exciter particle and its immediate surrounding.

A numerical model for a 1-D generic granular system according to embodiments of the present invention treats particles as rigid bodies connected by nonlinear springs to study acoustic excitations in the systems and the presence of band gaps, wave decay and possible presence of gap solitons deriving from the nonlinearity of the system response. Such a model can show that when a pulse was excited within the gap, the system responds with a rapid decay of the initial excitation already within the first 10 particles in the chain, with relevant attenuation of the pulse's intensity in the audible frequency range. Thanks to the high tunability of the highly nonlinear crystals, the forbidden frequency range can be effectively designed and varied at will, simply choosing the appropriate particles' mass ratio and static precompression applied to the system.

As indicated above, embodiments of the present invention may have particular application to linearized granular crystals (as phononic crystals). Just as crystalline materials can be said to possess a lattice structure, with atoms occupying various positions in the lattice, phononic-crystal engineered composite systems (i.e., "metamaterials") can be pictured as a lattice structure with nano to macro scale particles replacing their atomic counterparts. Such phononic crystals based on granular materials are most fundamentally typified in a statically precompressed one dimensional (1-D) chain of macroscopic particles. Due to zero tensile strength in the particle chain and a power-law relationship between force and displacement, linear, weakly nonlinear or highly nonlinear wave dynamics may arise, enabling the formation and propagation of solitary waves following impulsive loading and yielding desirable properties in their acoustic and mechanical response. Static compression of the particle chain prior to impulsive loading or "pre-compression" as discussed above enables the system to be tuned from highly nonlinear to weakly nonlinear to linear wave dynamics, enabling potential engineering applications in shock absorption, vibration dampening, and acoustic filtering (by forming acoustic band gaps).

Due to the nonlinear force versus displacement relationship and the discrete nature of granular-crystal systems, solitary (compression) waves readily form. Employing the long wave approximation, L>>a (where L is the width of the solitons and a is distance between particle centers), for any power law material of the form $F \propto \delta^n$, the speed of a solitary wave is given by Eq. (10) below:

$$V_s = (A_n \times a^{n+1})^{\frac{1}{2}} \times \sqrt{\frac{2}{n+1}} \times (\xi_m)^{\frac{(n-1)}{2}} \quad \text{Eq. (10)}$$

where $A_n$ is some constant dependant upon material properties, a is the particle diameter (distance between two particles centers), n is the exponent governing the force versus displacement relationship, and $\xi_m$ is the maximum strain in the system.

Relating $\xi_m$ to the maximum force in the system ($F_m$), Eq. (10) can be rewritten as Eq. (11) below:

$$V_s = a \times \sqrt{\frac{2 \times A_n^{\frac{1}{n}}}{(n+1) \times m^{\left(\frac{n-1}{n}\right)}}} \times (F_m)^{\frac{(n-1)}{2n}} \quad \text{Eq. (11)}$$

Just as pre-compression of a particle chain "tunes" the mechanical response to impulsive loading. Eq. (11) demonstrates that adjusting the exponent (n) provides an additional means of control over linearized granular crystals.

From an analytical perspective, the discrete nature of a 1-D granular crystal can be ignored if the system is treated as a continuum and if the particles are homogeneous in mass and material characteristics. However, the introduction of new material compositions and/or masses yields a "defect" into the system (i.e., an interface) and causes a breakdown of the analytical description of the system. Such "defects" introduce fundamentally different behavior into the granular medium and may have potential in energy trapping/redirecting, localization phenomena and shockwave mitigation applications. Returning to the test apparatus shown in FIG. 8, the chain of alternating stainless steel and Teflon beads demonstrated the nearly complete energy transfer across the interface between the Teflon and stainless steel beads in the uncompressed case, as shown by the lack of a reflected compression wave into the stainless steel beads. Introduction of multiple "defects" into a 1-D granular crystal through an alternating pattern of different particles/materials like in the case of Teflon and stainless steel beads demonstrates the ability of such a system to transform a shock-like impulse into a sequence of smaller amplitude pulses.

Observation of solitary waves in a 1-D chain of elliptical beads and empirical measurement of the exponent governing the force versus displacement relationship for elliptical particles provides experimental validation that a non-Hertzian system can support solitary wave propagation. Such an experimental validation also demonstrates that particle geometry changes offer a realizable mechanism for tuning the mechanical and acoustic response of linearized granular crystals.

The foregoing Detailed Description of exemplary and preferred embodiments is presented for purposes of illustration and disclosure in accordance with the requirements of the law. It is not intended to be exhaustive nor to limit the invention to the precise form or forms described, but only to enable others skilled in the art to understand how the invention may be suited for a particular use or implementation. The possibility of modifications and variations will be apparent to practitioners skilled in the art. No limitation is intended by the description of exemplary embodiments which may have included tolerances, feature dimensions, specific operating conditions, engineering specifications, or the like, and which may vary between implementations or with changes to the state of the art, and no limitation should be implied therefrom. This disclosure has been made with respect to the current state of the art, but also contemplates advancements and that adaptations in the future may take into consideration of those advancements, namely in accordance with the then current state of the art. It is intended that the scope of the invention be defined by the Claims as written and equivalents as applicable. Reference to a claim element in the singular is not intended to mean "one and only one" unless explicitly so stated. Moreover, no element, component, nor method or process step in this disclosure is intended to be dedicated to the public regardless of whether the element, component, or step is explicitly recited in the Claims. No claim element herein is to be construed under the provisions of 35 U.S.C. Sec. 112, sixth paragraph, unless the element is expressly recited using the phrase "means for . . . " and no method or process step herein is to be construed under those provisions unless the step, or steps, are expressly recited using the phrase "comprising step(s) for . . . "

What is claimed is:

1. A granular crystal comprising:
one or more granular chain of particles, wherein a geometry of at least one particle in one or more chain of particles is chosen to provide highly nonlinear mechanical or acoustical pulses having selected characteristics, wherein contact interactions between particles in the one or more granular chain of particles are non-Hertzian at all displacements of particles in the one or more granular chain of particles.

2. A granular crystal comprising:
a periodic distribution of granular particles, wherein the distribution is chosen to form acoustic band gaps in selected frequency ranges, wherein the acoustic band gaps depend upon one or more mass ratios of the granular particles.

3. A granular crystal comprising:
a periodic distribution of granular particles, wherein the distribution is chosen to form acoustic band gaps in selected frequency ranges, wherein precompression is applied to the granular particles and wherein the acoustic band gaps depend upon one or more mass ratios of the granular particles and one or more levels of the precompression.

4. A granular crystal comprising:
one or more granular chains of particles, wherein a geometry of at least one particle in one or more chains of particles is chosen to provide highly nonlinear mechanical or acoustical pulses having selected characteristics and wherein contact interactions between particles in the one or more granular chains of particles are non-Hertzian, wherein the selected characteristics of the pulses comprise an acoustic bandgap for the granular crystal and wherein the acoustic band gap depends upon one or more mass ratios of the granular particles.

5. A granular crystal comprising:
one or more granular chains of particles, wherein a geometry of at least one particle in one or more chains of particles is chosen to provide highly nonlinear mechanical or acoustical pulses having selected characteristics and wherein contact interactions between particles in the one or more granular chains of particles are non-Hertzian, further comprising apparatus applying precompression to at least one granular chains of particles and wherein the selected characteristics of the pulses comprise an acoustic bandgap for the granular crystal and wherein the acoustic band gap depends upon one or more mass ratios of the granular particles and one or more levels of the precompression.

6. The granular crystal according to claim 4, wherein the granular crystal comprises a one dimensional crystal and the one or more granular chains of particles comprises a single granular chain of particles.

7. The granular crystal according to claim 4, wherein the one or more granular chains of particles are arranged into a three dimensional structure.

8. The granular crystal according to claim 4, wherein the selected characteristics include one or more of the following characteristics: energy trapping characteristics; impulse redirection; and localization.

9. The granular crystal according to claim 2, wherein the periodic distribution of granular particles comprises layers of granular particles.

10. The granular crystal according to claim 2, wherein the granular particles comprise spherical particles, non-spherical particles, or some combination thereof.

* * * * *